United States Patent [19]

Stiles et al.

[11] Patent Number: 5,114,804
[45] Date of Patent: May 19, 1992

[54] BATTERY AND METHOD OF MAKING THE BATTERY

[75] Inventors: James A. R. Stiles, North Vancouver; Klaus Brandt, Vancouver, both of Canada

[73] Assignee: Moli Energy Limited, Canada

[21] Appl. No.: 625,622

[22] Filed: Dec. 4, 1990

Related U.S. Application Data

[63] Continuation of Ser. No. 470,996, Jan. 22, 1990, abandoned, which is a continuation of Ser. No. 403,286, Jul. 29, 1982, abandoned, which is a continuation-in-part of Ser. No. 292,606, Aug. 13, 1981, abandoned.

[51] Int. Cl.⁵ .................... H01M 2/10; H01M 4/02
[52] U.S. Cl. ........................................ 429/66; 429/94; 429/194; 29/623.5
[58] Field of Search .................. 429/66, 94, 122, 188, 429/194, 206; 29/623.5

[56] References Cited

U.S. PATENT DOCUMENTS

| | | | |
|---|---|---|---|
| 1,379,088 | 5/1921 | Edison | 429/66 |
| 2,594,713 | 4/1952 | Andre | 429/66 |
| 2,812,376 | 11/1957 | Yardney | 136/6 |
| 3,042,733 | 5/1960 | Toda et al. | 136/110 |
| 3,065,288 | 5/1960 | Smith et al. | 136/111 |
| 3,483,043 | 12/1969 | Steffens | 136/166 |
| 3,508,967 | 4/1970 | Lyall et al. | 136/20 |
| 3,775,182 | 11/1973 | Patton et al. | 136/13 |
| 3,796,606 | 3/1974 | Lehmann et al. | 136/13 |
| 3,969,139 | 7/1976 | Lai | 136/6 LN |
| 3,977,900 | 8/1976 | Luehrs | 429/194 |
| 3,998,164 | 10/1976 | Liang et al. | 429/199 X |
| 4,032,696 | 6/1977 | Urry | 429/101 |
| 4,053,689 | 10/1977 | Breiter | 429/102 |
| 4,091,178 | 5/1978 | Kordesch | 429/60 |
| 4,136,233 | 1/1979 | Eisenberg | 429/112 |
| 4,154,902 | 5/1979 | Schwartz | 429/105 X |
| 4,154,905 | 5/1979 | Urry | 429/94 |
| 4,189,529 | 2/1980 | Birt et al. | 429/112 X |
| 4,217,404 | 8/1980 | Verzwyvelt | 429/206 |
| 4,224,390 | 2/1981 | Haering et al. | 429/194 |
| 4,251,568 | 2/1981 | Hart | 429/49 |
| 4,251,606 | 9/1980 | Haering et al. | 429/194 |
| 4,260,668 | 4/1981 | Lecerf et al. | 429/194 |
| 4,317,869 | 3/1982 | Folus | 429/191 X |
| 4,336,314 | 6/1982 | Yonezu et al. | 429/145 X |
| 4,477,545 | 10/1984 | Akrudge et al. | 429/191 |

FOREIGN PATENT DOCUMENTS

| | | |
|---|---|---|
| 2153533 | 5/1973 | Fed. Rep. of Germany . |
| 1573347 | 7/1969 | France ............... 136/20 |
| 2316759 | 1/1977 | France . |
| 791501 | 3/1958 | United Kingdom . |
| 855812 | 12/1960 | United Kingdom . |
| 1312013 | 4/1973 | United Kingdom . |
| 1387131 | 3/1975 | United Kingdom . |
| 1387132 | 3/1975 | United Kingdom . |
| 1396062 | 5/1975 | United Kingdom ........ 429/134 |
| 1505473 | 3/1978 | United Kingdom . |
| 1556395 | 11/1979 | United Kingdom . |
| 2042788 | 9/1980 | United Kingdom . |

*Primary Examiner*—Stephen Kalafut
*Attorney, Agent, or Firm*—Lerner, David, Littenberg, Krumholz & Mentlik

[57] ABSTRACT

An electrode apparatus is disclosed including an electrode which forms a porous, exterior, amalgamated deposit thereon; and means for applying a compressive load to the electrode such that the deposit, when formed, is compressed so as to enhance stripping from the outer surface of said amalgamated deposit. Also a battery, a method of making a battery and a method of operating a battery including such an electrode apparatus are also disclosed.

49 Claims, 1 Drawing Sheet

BATTERY AND METHOD OF MAKING THE BATTERY

This is a continuation of application Ser. No. 07/470,996 filed Jan. 22, 1990, which is a continuation of application Ser. No. 06/403,286 filed Jul. 29, 1982, which is a continuation-in-part of Ser. No. 06/292,606 filed Aug. 13, 1981, all now abandoned.

BACKGROUND OF THE INVENTION

This invention relates to an electrode apparatus including means for applying a compressive load to the electrode and also to a battery and methods employing such an electrode apparatus.

The number of times that a metal electrode, for example an alkali metal anode (i.e., the negative electrode), of an electrolytic cell (battery) can be repeatedly discharged and recharged usually determines the reversibility of the battery. Assuming an excess of electrolyte, the reversibility (R) is the number of complete charges and discharges (cycles) obtainable from a cell, and is given by the product of the number of turnovers (T) achievable for the electrode times the ratio ($\alpha$) of the amount of metal contained in the electrode to the stoichiometric amount of metal required for complete reaction of the opposite electrode (i.e., $R = \alpha T$). A turnover (T) is defined as one complete stripping (removal) of the metal from the electrode followed by a complete amalgamation (replating) of the metal onto the electrode. In general, this process cannot be repeated indefinitely because corrosion or physical isolation of the metal within the electrode structure renders it progressively more and more difficult to strip. In some cases, the metal becomes inaccessible for stripping and becomes electrochemically inactive. To compensate for the progressive loss of active metal available for stripping, batteries often include more metal in the electrode than is required for complete reaction with the electrolytically active component of the opposite electrode. Thus, the reversibility is generally a function of the method of stripping and replating, the quantity of metal available in the electrode and the quantity of electrolyte available.

For example, with free-standing (unpressurized) lithium electrodes, a battery has a maximum of between about 1.6–2.5 turnovers, using electrolytes consisting of 1 M LiAsF$_6$ or 1 M LiClO$_4$ in propylene carbonate. It would be highly desirable to be able to increase the reversibility of such electrodes and batteries.

SUMMARY OF THE INVENTION

It has now been found that in accordance with the present invention a significant increase in the number of turnovers can be achieved for electrodes which form porous, exterior amalgamated deposits thereon. The present invention provides an electrode apparatus comprising an electrode which forms such a porous, exterior, amalgamated deposit thereon, and means for applying a compressive load to the electrode such that the deposit, when formed, is compressed so as to enhance stripping from the outer surface of said amalgamated deposit. The invention also provides a battery comprising a cathode, an anode, an electrolyte, wherein said anode forms such a porous, exterior, amalgamated deposit thereon, and means for applying a compressive load to the anode such that the deposit, when formed, is compressed so as to enhance stripping from the outer surface of said amalgamated deposit. Preferably, the electrode is an alkali metal anode, e.g., a lithium anode. Also, the compressive load is preferably applied continuously at least during recharging.

The present invention further provides a method of making a battery and a method for operating a battery to increase its reversibility by increasing the number of turnovers available within an electrode of the cell. The method of making the battery includes the step of constructing an electrolytic cell having a cathode, an anode, and an electrolyte, wherein said anode forms such a porous, exterior, amalgamated deposit thereon. A compressive load is applied to such anode as described above. Again, the electrode is preferably an alkali metal anode, e.g., a lithium anode, and the compressive load is preferably applied to the electrode continuously during both discharging and recharging.

The electrode apparatus, battery and methods of the present invention provide a number of distinct advantages. The application of the compressive load forces the particle or grains of the amalgamated deposit on the electrode closer together. As discussed in more detail below, this can also decrease the electrical resistance between the grains and provide for increased resistance to metal ion migration through the porous deposit from the grains in question. Thus, by the present invention, the stripping of metal from the outer surface of the electrode (i.e., from the front of the deposit) is enhanced.

In one embodiment of the invention, the electrolytic cell (battery) comprises at least one cathode, an alkali metal anode, at least one separator deposed between the anode and cathode, a nonaqueous electrolyte, and a means for applying a compressive load which exceeds the compressive strength of the amalgamated deposit on the anode, i.e., the compressive load is such that it deforms the deposit to push the deposit grains closer together and decrease the porosity of the deposit and decrease the electrical resistance between the grains of the deposit. Preferably, the load exceeds the compressive strength of the substrate on which the deposit is plated, i.e., the compressive load is sufficient to physically deform the substrate. As modeled, this load enhances stripping of alkali metal from the electrolytic alkali metal grains at the front of the amalgamated deposit (between the anode and the separator) with the result that the reversibility of the battery is increased significantly. Methods of making the battery of this invention are also disclosed.

The present invention provides particularly advantageous results with lithium electrodes. At a critical pressure, above which the lithium electrode will deform, a plating morphology drastically different from that formed at low pressures is obtained. Plating deposits obtained with lithium at low pressure, as observed under a scanning electron microscope, are very porous in nature, with grains in the form of loose platelets or thin, jointed rod like grains. Plating deposits obtained above the critical pressure are substantially nonporous in nature. The grains are regular columns with their axes aligned perpendicular to the surface of the substrate. The columns are close packed with respect to one another, so that the ends of the columns form a nonporous, smooth surface parallel to the substrate surface. This type of deposit can be maintained over many successive dissolution and plating [discharge and charge] cycles. It has been observed in special cases, where the pressure varies across a lithium electrode, that a sharp boundary exists between porous types of deposits and the smooth, columnar type of deposit. This shows that the plating morphology is sharply dependent on the pressure near the critical pressure.

In another preferred embodiment, the cathode is one which provides a uniform current density, e.g., a $MoS_2$ cathode and the anode is an alkali metal having an alkali metal substrate interior and an amalgamated deposit exterior comprising electrolytic, alkali metal grains having individual passivation films (preferably formed by replating alkali metal on the anode). In one such preferred embodiment, the cathode is a transition metal chalcogenide containing $Li_xMoS_2$ and the anode is lithium. Preferably the $Li_xMoS_2$ cathode-active material is pre-conditioned to operating in "Phase 11" as described in U.S. Pat. No. 4,224,390, the disclosure of which is incorporated herein by reference.

BRIEF DESCRIPTION OF THE DRAWINGS

In order that the invention may by fully understood, it will now be described with reference to the accompanying drawings, in which.

DETAILED DESCRIPTION OF THE INVENTION

Figure 1:
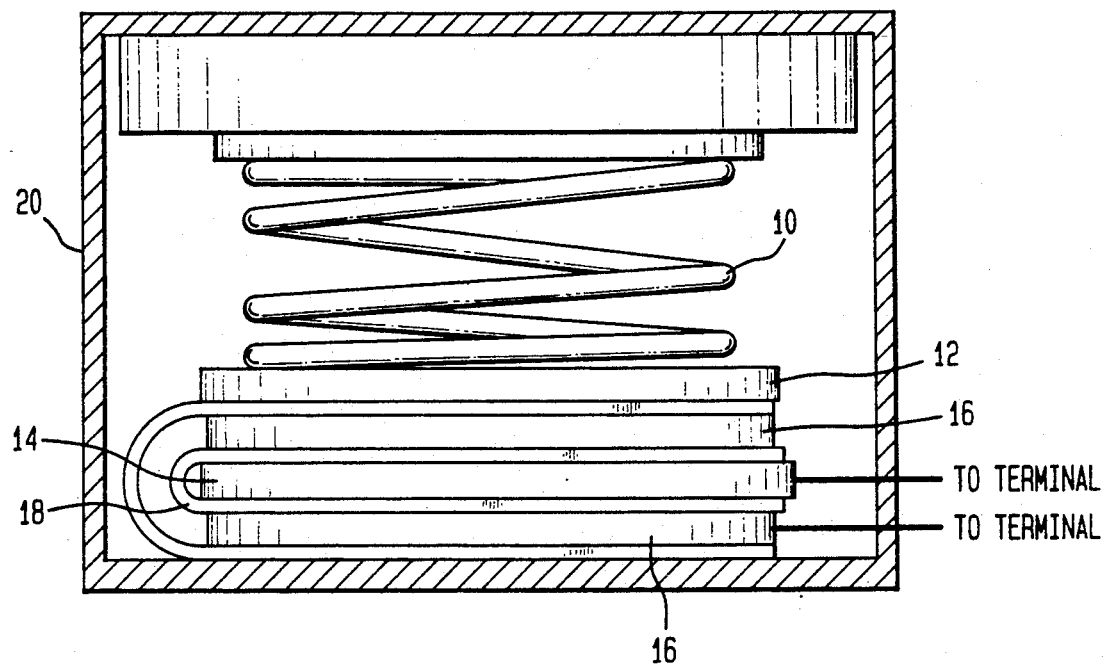
FIG. 1 is a schematic of a battery in accordance with the invention.

Certain electrode materials such as alkali metals, e.g., lithium, are thermodynamically unstable in the presence of metal ion-conducting electrolytes that are liquids at ambient temperature. For example, aqueous electrolytes react violently with alkali metals to form alkali hydroxides and hydrogen gas. Often, this reaction is so violent as to be explosive. Some electrolytes, however, react less violently with electrode metals to form kinetically stable passivation films on the surface of the metal electrode. These latter electrolytes can be used to construct practical cells that use metal electrodes.

For example, after cycling such a metal electrolytic cell, two portions of the electrode are physically isolatable. They are (1) a central, essentially nonporous, metal substrate having a passivation film and (2) a porous, plated, amalgamated deposit of electrolytically active metallic grains, wherein each grain has a passivation film.

Wherever such a metal electrode is exposed to electrolyte, a chemical reaction will begin to occur. The reaction of the electrolyte with the metal creates a passivation film on the surface of the metal. This passivation film is essentially nonporous, although it is ion-permeable. The film tends to isolate the metal grains electrochemically. The desired electrical conductance for the film on the grains balances between increasing the rate of the passivation reaction by too high a conductance and decreasing the electrochemical activity of grains through too low a conductance. While a low conductance reduces the rate of reaction of electrolyte and metal, the low conductance increases the stripping of metal from the substrate rather than from within the grains (because of the high contact resistance between grains).

To have a high turnover number (T) and to minimize the surface area of the metal electrode (so that the reaction with the electrolyte to form additional passivated metal is minimized), it is advantageous that stripping of electrolytically active metal preferentially occurs at the front (outside) of the deposit rather than within the deposit or at the surface of the underlying, nonporous substrate. If the front (outside) is not stripped while underlying portions of the substrate are, the front loses physical contact with the rest of the deposit and the substrate. As a result, the front becomes electrochemically inactive. Pressurizing the electrode above the compressive strength of the deposit (i.e., to deform the deposit so as to force the grains of the deposit together) allows the front to be preferentially stripped.

Three factors may contribute to the resistance to stripping of the different portions of the electrode during operation of the battery. These resistance factors are:

(1) the electrical resistance between the grain (of the deposit) in question and the current collector;

(2) the ionic resistance associated with the migration of metal ions through the porous deposit from the grain in question; and (3) the resistance associated with stripping a metal ion from a grain and transporting that ion through a passivating film.

Respecting factor (1), ordinarily the electrical resistance is highest for those grains which are nearest the front of the deposit. In fact, it is reasonable to assume that the electrical resistance is essentially zero for grains which lie at the surface of the substrate. Respecting factor (2), the ionic resistance is highest for the substrate and reduces for grains that lie closer to the front of the deposit. The ionic resistance is lowest at the front of the deposit where the diffusion of the ions to reach active grains is the shortest, and is highest at the substrate to which the diffusion path is the longest. Finally, as to factor (3), the passivating film resistance is controlled by the chemical nature of the passivating film and cannot be substantially altered by changing the physical parameters of the deposit.

By applying a compressive load to the surface of the amalgamated deposit (preferably normal to the deposit) that exceeds the compressive strength of the deposit as explained above, a two-fold effect is achieved. First, the porosity of the deposit is decreased by moving grains closer together as the deposit is compressed. Reducing the porosity has the effect of increasing the ionic resistance to stripping more for the substrate than for the front. At the same time, the electrical resistance between grains of the deposit is reduced because the surface-contact area between adjacent grains increases. The net result of the compression is, then, to increase the sum of the three resistance factors near the substrate and the decrease the sum of these resistances for grains near the front of the deposit and achieves the desired effect of improving the reversibility of the battery. (The front is also conveniently identified as the interface between the electrode and the separator). Thus, the compressive load resulting in a smooth, nonporous surface which provides good electromotive activity for the electrode and allows stripping of the electrode from the outer surface thereof.

The present invention can be employed with any battery employing an electrode which will react with the electrolyte to form an amalgamated, porous deposit on the electrode, especially during recharging. For example, anode materials such as alkali metals, alkaline earth metals and transition metals such as zinc, will form deposits thereon by reaction with certain electrolytes. Thus, alkali metals, e.g., lithium, in the presence of a nonaqueous electrolyte such as propylene carbonate including LiClO$_4$ forms a salt deposit on the alkali metal and on grains of the alkali metal deposited during recharging (replating).

The compressive load, as explained above, is such that it will deform the deposit by compressing particles or grains of the deposit closer together. Accordingly, the compressive load employed in the present invention varies depending upon the nature of the electrode, the electrolyte and the deposit. A softer metal will require a lower compressive load. For example, the compressive load under which alkali metals deform is typically low and all alkali metals are soft and ductile, e.g., the tensile strength of lithium is in the range of 60–80 psi. Considering that the deposit is a porous metal deposit in which the void spaces are filled with liquid electrolyte, the compressive strength (i.e., force at which the material will deform under pressure) of the deposit is less than or equal to that for the pure metal.

The compressive load does not necessarily have to be applied continuously during charging and discharging. Application of the compressive load to compress the deposit may be, in fact, of short duration, for example, by applying a compressive load for a time during the end of the recharging cycle or even applying the compressive load after recharging and prior to further use. However, the compressive load is preferably applied continuously at least during recharging.

With lithium a compressive load of from about 50 to about 500 psi is preferably applied continuously during recharging. As noted above, such a compressive load on the lithium electrode (e.g., lithium with an appropriate substrate) during recharging results in grains of material being plated thereon having columns with their axes aligned substantially perpendicular to the substrate.

Placing a compressive load on the electrode constrains the materials from which the entire cell is constructed. The cell components are preferably soft and pliable so that the load can be applied uniformly. Use of expanded metal grids for current collectors and hard, gritty powders for electrode-active materials is discouraged. The separator material also should be pliable. Preferably, metallic foils are used as current collectors, and soft materials, such as graphite or molybdenum sulfide (transition metal chalcogenide cathode-active cathodes) are used for the cathode. If possible, the cathode supplies a uniform current density to assure uniform use of the substrate. Polypropylene or other suitable flexible, porous or semipermeable separators are preferred.

Figure 2:
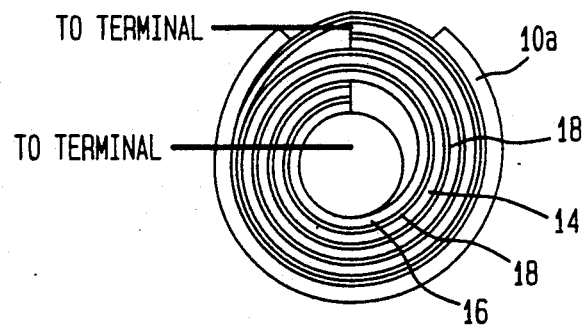
FIG. 2 is a schematic of a spiral battery in accordance with the invention.

As shown in FIG. 1, the means to apply a compressive load may be a simple coil spring 10 which bears upon a pressure plate 12 stacked atop the battery. Of course, other suitable pressure means may be used. FIG. 2 shows a spiral battery wherein an elastic separator and a C-clamp 10a bear radially on the cell to supply the desired load. In both cases, the compressive load of the spring and C-clamp is sufficient to provide the desired decrease in porosity of the deposit and the desired decrease in electrical resistance between grains of the deposit.

Further explaining FIG. 1, an electrolytic cell (battery) has an anode 14 (with a corresponding current collector) sandwiched between two cathodes 16 (with corresponding current collectors). Electrolyte-saturated separators 18 isolate the anode 14 from the cathodes 16 and carry the electrolyte for the cell in their pores. The anode, cathodes, and separators form a cell, which is electrochemically active to product current. The anode is of a composition such that a porous, amalgamated deposit will form thereon as discussed above. Placed in a housing 20, the cell is compressed, as already described. The housing 20 is preferably hermetically sealed in a nonreactive atmosphere.

Figure 3:
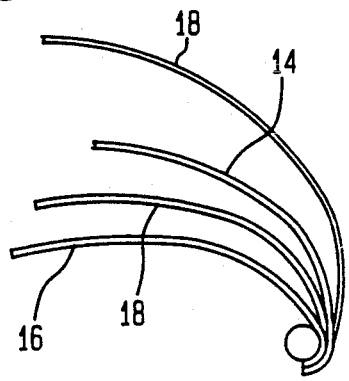
FIG. 3 is a schematic of the winding operation for a spiral battery.

Directing attention to FIG. 3, in making a spiral cell (battery), the elasticity of two separator layers 18—18, one between the anode 14 and cathode 16, and the other on the outside, is relied upon to provide a radial compressive load on the desired electrode, i.e., either the anode 14 or cathode 16, by tight winding of the layers into a coil around a conductor. The tension on the separator layers is maintained by the C-clamp 10a to provide the desired compressive load. Polypropylene may be used for the layers 18—18.

The following examples are given to illustrate the electrode apparatus, battery and methods of this invention, and should not be interpreted to limit the scope of the invention.

EXAMPLE 1

An electrolytic cell was constructed between two flat, rigid pressure plates. The cathode consisted of a surface-treated molybdenite powder which was spread uniformly on an aluminum-foil substrate, as described in U.S. Pat. No. 4,251,606. (This patent is incorporated by reference into this specification.) The cathode provides a uniform current density for the cell. The molybdenite powder was spread at 10 mg/cm$^2$ on the aluminum foil. The area of the cathode was 5.6 cm$^2$. The anode was a similar sized sheet of lithium foil of a thickness of about 125 microns sandwiched between two cathodes with microporous polypropylene separators (Celgard 2500 available from the Celanese Corporation). The electrolyte was 1 M LiAsF$_6$ in propylene carbonate. The propylene carbonate was initially purified to a total impurity content of less than about 100 ppm. The cathode and separators were initially saturated with electrolyte.

The cell was assembled between pressure plates, and a pressure of 27 psi was applied to the cell through the plates. The entire cell was enclosed in a hermetically sealed container filled with argon gas. A glass-to-metal seal was used for the current feed-through for the negative terminal of the electrolytic cell. The cell was conditioned to convert the cathode-active material to "Phase II" Li$_x$MoS$_2$, as described in the U.S. Pat. No. 4,224,390. (This patent is incorporated by reference in this specification.) Care was taken to ensure that the electrolyte did not degrade during the conversion process. The cell was cycled (charged and discharged) at a current of 2 mA on both recharge and discharge repeatedly between a lower voltage limit of 1.3 volts on discharge and an upper limit of 2.6 volts on recharge. Cycling continued until the charge capacity on discharge fell to fifty percent (50%) of the charge capacity measured at the end of the tenth cycle. The total amount of charge obtained from cell on discharge integrated over all cycles was calculated to be 210 mAH. Calculated by taking the ratio of this amount of charge as compared to the theoretical charge expected if the entire lithium anode was discharged in one cycle, the number of turnovers (T) for the lithium anode was three.

EXAMPLE 2

An electrolytic cell similar to the one constructed in Example 1 in all respects, except that the electrodes were subjected to a pressure of 50 psi, was cycled under identical conditions to those described in Example 1. The number of turnovers (T) for the lithium anode in this second cell equaled eight.

EXAMPLE 3

An electrolytic cell similar to the one constructed in Example 1 in all respects, except that the electrodes were subjected to a pressure of 100 psi, was cycled under identical conditions to those described in Example 1. The number of turnovers (T) for the lithium anode in this third cell equaled nine.

EXAMPLE 4

An electrolytic cell similar in all details to the cell of Example 1, except that the electrodes were subjected to a pressure of 170 psi, was cycled under identical conditions to those described in Example 1. The number of turnovers (T) of the lithium anode in this fourth cell equaled eleven.

EXAMPLE 5

An electrolytic cell similar in all respects to the cell constructed in Example 4, except that the supporting electrolyte used was 0.5 M $LiClO_4$ instead of 1 M $LiAsF_6$, was constructed and tested under the same conditions as those of Example 3. The number of turnovers (T) equaled seven.

Example 5 shows that the application of pressure played at least as important a role in determining the number of turnovers as the choice of the electrolyte in the cell. Although the number of turnovers varies with the choice of the electrolyte, the number of turnovers achievable by applying pressure to the cell is always greater than the number of turnovers possible when running the cell freestanding.

It will be merely understood that the embodiments described above are merely exemplary and that persons skilled in the art may make many variations and modifications without departing from the spirit and scope of the invention. All such modifications and variations are intended to be included within the scope of the invention as defined by the appended claims.

What is claimed is:

1. A reversible battery cell comprising a cathode capable of providing a substantially uniform current density for said battery cell; an anode comprising a lithium metal substrate; a non-aqueous electrolyte; and means for substantially continuously applying a compressive load to said anode during both the charging and the discharging of said reversible battery cell under charging conditions of current density inhibiting the formation of dendrites, said compressive load being sufficient to inhibit the formation of a porous deposit of exterior, irregularly oriented, amalgamated grains when lithium metal is deposited on said lithium metal substrate of said anode and thereby to produce a substantially non-porous deposit structure providing enhanced reversibility for the anode.

2. A battery cell according to claim 1, wherein said means for substantially continuously applying said compressive load comprises means for applying a compressive load of at least about 50 psi to said anode.

3. A battery cell according to claim 1, wherein said means for substantially continuously applying a compressive load applies a compressive load of from abut 50 to about 500 psi.

4. A battery cell according to claim 1, wherein said anode consists essentially of lithium metal.

5. A battery cell according to claim 4, wherein said lithium metal deposit comprises close-packed grains having columns with their axis aligned substantially perpendicular to said substrate.

6. A battery cell according to claim 1 further comprising a separator disposed between the anode and the cathode.

7. A battery cell according to claim 6, wherein the separator is microporous polypropylene.

8. A battery cell according to claim 1, wherein the cathode is a transition metal chalcogenide cathode.

9. A battery cell according to claim 8, wherein said cathode comprises $MoS_2$ as a cathode active material.

10. A battery cell according to claim 8, wherein the cathode active material is $MoO_2$ surface-treated $MoS_2$.

11. A battery cell according to claim 10, wherein the cathode active material is coated on a metallic foil.

12. A battery cell according to claim 11, wherein the metallic foil is aluminum.

13. A battery cell according to claim 9, wherein the cathode active material has been conditioned to "Phase II" $Li_xMoS_2$.

14. A battery cell according to claim 10, wherein the cathode active material has been conditioned to "Phase II" $Li_xMoS_2$.

15. A battery cell according to claim 1, wherein the electrolyte solvent comprises propylene carbonate.

16. A battery cell according to claim 15, wherein the electrolyte solute is selected from the group consisting of $LiAsF_6$ and $LiClO_4$.

17. A battery cell according to claim 6, wherein the cathode, anode and separator are substantially planar and wherein said means for substantially continuously applying a compressive load comprises means for sandwiching these elements between flat pressure plates.

18. A battery cell according to claim 6, wherein said means for substantially continuously applying a compressive load to said anode comprises means for tightly winding said cathode, anode, and separator in the form of a spiral.

19. A method of making a reversible battery cell for use in a battery, said method comprising the steps of: constructing an electrolytic cell having a cathode and capable of providing a uniform current density for said battery, an anode comprising a lithium metal substrate, and a non-aqueous electrolyte; and substantially continuously applying a compressive load to said anode during both the charging and discharging of said reversible battery cell under charging conditions of current density inhibiting the formation of dendrites sufficient to inhibit the formation of a porous deposit or exterior, irregularly oriented, amalgamated grains when lithium metal is deposited on said lithium metal substrate of said anode and thereby produce a substantially non-porous deposit structure providing enhanced reversibility for the anode.

20. The method according to claim 19, wherein said step of applying a compressive load to said anode comprises applying a compressive load of at least about 50 psi to said anode.

21. The method according to claim 20, wherein said step of applying a compressive load comprises applying a compressive load of between about 50 to about 500 psi.

22. A method according to claim 19, wherein said anode consists essentially of lithium metal, and wherein said current density is less than about 1.67 mA/cm$^2$.

23. A method according to claim 22, wherein said lithium metal deposit comprises close-packed grains having columns with their axis aligned substantially perpendicular to said substrate, and wherein said current density is less than about 0.67 mA/cm$^2$.

24. A method according to claim 19, including disposing a separator between the anode and cathode.

25. A method according to claim 19, wherein the cathode is a transition metal chalcogenide cathode.

26. A method according to claim 25, wherein said cathode comprises MoS$_2$ as a cathode active material.

27. A method according to claim 26, wherein the cathode active material is MoO$_2$ surface-treated MoS$_2$.

28. A method according to claim 24, wherein a cathode active material is coated on a metallic foil.

29. A method according to claim 28, wherein the metallic foil is aluminum.

30. A method according to claim 26, wherein the cathode active material is conditioned to "Phase II" Li$_x$MoS$_2$.

31. A method according to claim 27, wherein the cathode active material is conditioned to "Phase II" Li$_x$MoS$_2$.

32. A method according to claim 24, wherein the cathode, anode and separator are substantially planar and wherein the compressive load is applied by sandwiching these elements between flat pressure plates.

33. A method according to claim 24, wherein the cathode, anode, and separator are tightly wound in the form of a spiral.

34. A reversible battery cell comprising a cathode capable of providing a substantially uniform current density for said battery cell, an anode consisting essentially of lithium metal, a non-aqueous electrolyte, and means for applying a compressive load to said anode, said means for applying a compressive load being effective to continuously maintain said compressive load at least during the recharging of said reversible battery cell at a level of at least about 50 psi, and under charging conditions of current density inhibiting the formation of dendrites, said compressive load being sufficient to inhibit the formation of a porous deposit of exterior, irregularly oriented, amalgamated grains when lithium metal is deposited on said anode and thereby to produce a substantially non-porous deposit structure providing enhanced reversibility for said anode.

35. A reversible battery cell according to claim 34, wherein said means for applying said compressive load is effective to continuously maintain said compressive load at least during said recharging of said reversible battery cell at a level of between about 50 and 500 psi.

36. A battery cell according to claim 34, wherein said lithium metal deposit comprises close-packed grains having columns with their axis aligned substantially perpendicular to said substrate.

37. A battery cell according to claim 34, further comprising a separator disposed between said anode and said cathode.

38. A battery cell according to claim 37, wherein said separator comprises microporous polypropylene.

39. A battery cell according to claim 34, wherein said cathode comprises a transition metal chalcogenide cathode.

40. A battery cell according to claim 39, wherein said cathode comprises MoS$_2$ as a cathode active material.

41. A battery cell according to claim 39, wherein said cathode active material is MoO$_2$ surface-treated MoS$_2$.

42. A battery cell according to claim 41, wherein said cathode active material is coated on a metallic foil.

43. A battery cell according to claim 42, wherein said metallic foil comprises aluminum.

44. A battery cell according to claim 40, wherein said cathode active material has been conditioned to "Phase II" Li$_x$MoS$_2$.

45. A battery cell according to claim 41, wherein said cathode active material has ben conditioned to "Phase II" Li$_x$MoS$_2$.

46. A battery cell according to claim 34, wherein said electrolyte solvent comprises propylene carbonate.

47. A battery cell according to claim 46, wherein said electrolyte solute is selected from the group consisting of LiAsF$_6$ and LiC10$_4$.

48. A battery cell according to claim 37, wherein said cathode, anode and separator are substantially planar and wherein said compressive load is applied by sandwiching these elements between flat pressure plates.

49. A battery cell according to claim 37, wherein said cathode, anode and separator are tightly wound in the form of a spiral.

* * * * *

UNITED STATES PATENT AND TRADEMARK OFFICE
CERTIFICATE OF CORRECTION

PATENT NO. : 5,114,804

DATED : May 19, 1992

INVENTOR(S) : James A. R. Stiles and Klaus Brandt

It is certified that error appears in the above-identified patent and that said Letters Patent is hereby corrected as shown below:

Column 3, line 15, delete "11" and insert therefor --II--.
Column 8, line 57, delete "or" and insert therefor --of--.
Column 9, line 19, delete "24" and insert therefor --27--.
Column 10, line 34, delete "ben" and insert therefor --been--.

Signed and Sealed this

Twentieth Day of July, 1993

Attest:

MICHAEL K. KIRK

Attesting Officer

Acting Commissioner of Patents and Trademarks